United States Patent
Gaully et al.

(10) Patent No.: US 9,310,276 B2
(45) Date of Patent: Apr. 12, 2016

(54) METHOD AND DEVICE FOR DETERMINING THE AIR BLEED ON AN AIRCRAFT TURBOJET ENGINE

(71) Applicant: SNECMA, Paris (FR)

(72) Inventors: Bruno Robert Gaully, Marolles En Hurepoix (FR); Jerome Guy Roger Sebaa, Alfortville (FR)

(73) Assignee: SNECMA, Paris (FR)

( * ) Notice: Subject to any disclaimer, the term of this patent is extended or adjusted under 35 U.S.C. 154(b) by 308 days.

(21) Appl. No.: 14/043,140

(22) Filed: Oct. 1, 2013

(65) Prior Publication Data
US 2014/0090458 A1  Apr. 3, 2014

(30) Foreign Application Priority Data
Oct. 3, 2012 (FR) ..................... 12 59405

(51) Int. Cl.
*G01M 15/02* (2006.01)
*F02C 6/08* (2006.01)
*F02C 9/18* (2006.01)

(52) U.S. Cl.
CPC ............... *G01M 15/02* (2013.01); *F02C 6/08* (2013.01); *F02C 9/18* (2013.01); *F05D 2260/213* (2013.01); *F05D 2260/84* (2013.01); *F05D 2270/101* (2013.01); *F05D 2270/3013* (2013.01); *F05D 2270/3015* (2013.01); *Y02T 50/675* (2013.01)

(58) Field of Classification Search
CPC ........ F02C 6/08; F02C 9/18; F05D 2270/301; G01M 15/14
USPC ..................................... 73/112.01
See application file for complete search history.

(56) References Cited

U.S. PATENT DOCUMENTS

| | | | |
|---|---|---|---|
| 5,155,991 A | 10/1992 | Bruun | |
| 5,161,364 A | 11/1992 | Bruun et al. | |
| 6,494,047 B2 * | 12/2002 | Yeung ................ | B64D 13/00 60/782 |
| 7,036,319 B2 * | 5/2006 | Saunders ............ | F02C 6/02 60/782 |
| 7,536,865 B2 * | 5/2009 | Mikhail .............. | B64D 13/00 60/782 |
| 8,033,118 B2 * | 10/2011 | Monteiro ............ | F02C 6/08 60/782 |
| 8,452,515 B2 * | 5/2013 | Drohan ............... | F01D 17/08 700/286 |
| 2009/0193811 A1 | 8/2009 | Monteiro et al. | |
| 2013/0073170 A1 * | 3/2013 | Drohan ............... | F01D 17/08 701/100 |

FOREIGN PATENT DOCUMENTS

| | | |
|---|---|---|
| EP | 0 507 725 A1 | 10/1992 |
| JP | 2006-290096 | 10/2006 |
| WO | WO 2009/094734 A2 | 8/2009 |

OTHER PUBLICATIONS

French Preliminary Search Report issued Jul. 9, 2013, in French Application No. 12 59405 filed Oct. 3, 2012 (with English Translation of Categories of Cited Documents).

* cited by examiner

*Primary Examiner* — Freddie Kirkland, III

(74) *Attorney, Agent, or Firm* — Oblon, McClelland, Maier & Neustadt, L.L.P.

(57) ABSTRACT

The device comprises first means for determining a pressure value relative to the pressure at the outlet of a precooler of an air bleed system and second means for calculating the air bleed level using this pressure value, said first means comprising means for calculating a first pressure value at the outlet of the precooler, using the pressure measured by a sensor, means for receiving a pressure measured by a second sensor, which represents a second pressure value at the outlet of the precooler and means for selecting one of said first and second pressure values, which is then transmitted to said second means for calculating said air bleed level.

9 Claims, 1 Drawing Sheet

METHOD AND DEVICE FOR DETERMINING THE AIR BLEED ON AN AIRCRAFT TURBOJET ENGINE

BACKGROUND OF THE INVENTION

1. Field of the Invention

The present invention relates to a method and a device for determining the air bleed on an aircraft turbojet engine.

2. Description of the Related Art

It is known that an aircraft such as, for example, an airplane, comprises a fuselage in which are arranged a cockpit and a passenger cabin and at least one power plant, notably formed of turbojet engines. Air bleeds are carried out by a system, referred to as an air bleed system, comprising a plurality of valves and a precooler. These valves allow the bleeding of air in various air flows flowing in or around the turbojet engine, for example a high pressure air flow, at high temperature, bled at the level of the engine, an intermediate pressure air flow, at lower temperature, also bled at the level of the engine and a cold fan air flow, bled at the level of the fan. The high pressure air flow or the intermediate pressure air flow can be supplied to the precooler. The precooler then allows a heat exchange between the flow (high pressure or intermediate pressure) thus received and the fan air flow making it possible to lower the temperature of said flow (high pressure or intermediate pressure) at the outlet of the precooler in order to supply, for example to the cockpit or to the passenger cabin of the aircraft, a flow at a regulated temperature. Such regulation is obtained by controlling the opening of a valve for bleeding the air flow.

In order to control an engine, the usual logics used for this purpose must know, in real time, the air bleed levels (aircraft and engine on the compressor and the HP (high pressure) or IP (low pressure) bleed port.

It the aircraft data on the bled air flows are too inaccurate or unreliable (the valid error rate of the aircraft data is too high) with respect to feared events relating to the engine (loss of thrust), the engine control system can be made to include a flow measurement on the engine (via a venturi or a diaphragm or across the exchanger of the air bleed system).

It is furthermore known that, for the purpose of ensuring the same thrust of the engine (same engine speed, same pressure in the chamber) in the case of an air bleed by the aircraft, the engine control loop will increase the fuel injection rate. Protections known as anti-surge or C/P means are generally provided by means of an open loop stop limiting the maximum or minimum injectable fuel flow at a given time of the acceleration or of the deceleration.

It is always necessary to have an exact and reliable estimation of the air bleed. In fact, in general it is known that:

an under-estimation of the bleed flow can result in a backing-off. The under-estimation of the flow, referred to as WBAS, results in a C/P stop very close to the C/P operating point. As the engine needs to increase the injection of fuel in order to maintain the same engine speed, there is a risk of saturating the metering system very quickly and therefore of having a backing-off of the engine resulting in a loss of thrust which can go as far as shutting down the engine; and an over-estimation of the bleed flow results in a loss of the surge protection. The over-estimation of the WBAS flow results in a C/P acceleration stop that is higher with respect to the variation of the C/P operating line and of the surge line. This risk of surge related to the loss of surge protection can result in an undesirable loss of thrust (able to go as far as shutting down the engine).

For reasons of reliability, there is generally available, in a computer which is used for determining the air bleed, two separate channels for acquiring and calculating the bleed air flow. More precisely, it is known that one of said channels uses, for this purpose, a PBAS pressure measurement taken by a pressure sensor provided at the outlet of the precooler. It is known that, if it is desired to fly the aircraft and supply it with air, it must be possible to correct the C/P air bleeds. Thus, it is necessary to have available the PBAS measurement which contributes to the calculation of the density of the air in the calculation of the flow bled from the engine, as explained below.

The aircraft must therefore have two operational calculation channels available.

BRIEF SUMMARY OF THE INVENTION

The purpose of the invention is to overcome these disadvantages. It relates to a particularly reliable method for determining an air bleed on an aircraft turbojet engine.

For this purpose, according to the invention, said method for determining an air bleed on an aircraft turbojet engine, carried out by an air bleed system comprising, in the direction of the air bleed:

at least a first valve arranged on an air bleed duct on the high pressure compressor of the turbojet engine, with which a first pressure sensor is associated;

a saturation valve arranged at the inlet of a precooler;

said precooler; and a second pressure sensor, arranged at the outlet of the precooler, said second sensor measuring the pressure at the outlet of the precooler and intended for monitoring the operation of the saturation valve, a method according to which:

A/ there is determined a pressure value relative to the pressure at the outlet of the precooler; and B/ the air bleed level is calculated using this pressure value, is noteworthy in that in step N:

a) a first value of pressure at the outlet of the precooler is calculated using the pressure measured by said first sensor;

b) a pressure measured by said second pressure sensor, which represents a second value of pressure at the outlet of the precooler, is received; and c) the one of said first and second pressure values that is used in step B/ for calculating said air bleed level is selected.

Thus, due to the invention, there is available, in addition to a pressure value measured directly in the usual manner at the outlet of the precooler by said second sensor, an additional pressure value which is determined analytically as described below. This makes it possible to select the most reliable pressure value for calculating the air bleed level and thus to obtain a reliable and precise value of said air bleed level.

The method according to the invention, which makes it possible to obtain a redundant pressure value at the outlet of the precooler simply by using an analytical model, does not necessitate a new sensor or new sensors on the engine for its implementation, which makes it possible to limit the cost and the weight of this solution and avoids making the installation of the engine more complex (where there is little space). The analytical redundancy is produced from said first pressure sensor (described below), the measurement from which is acquired by a channel of the computer, which is different from the channel for acquisition of the direct measurement of said pressure for said second pressure sensor, as described below.

The redundancy of the flow measurement that can be obtained by means of the invention makes it possible to satisfy the error rate in "full-up" (computer completely operational on both channels) or in "single channel dispatch" (a single channel of the computer being active) and allows the takeoff of the aircraft with a single active channel of the engine computer with an engine air bleed operational.

The following operations are advantageously carried out in step A/a):

the pressure PHPV at the level of said first valve is measured using said first pressure sensor;

a pressure difference DPBAS is measured across said precooler; and said first pressure value PBAS1 at the outlet of said precooler is calculated using the following formula:

$$PBAS1 = PHPV - PRSOV - DPBAS$$

in which PRSOV represents a predetermined value, corresponding to a pressure loss between said first valve and the inlet of the precooler.

Moreover, advantageously:

said first pressure value PBAS1 is limited to a predetermined value; and/or said pressure difference DPBAS is determined by means of measurements made by two separate sensors.

Moreover, the following selection is advantageously made in step A/c):

if said first and second pressure values are valid and these pressure values are inconsistent, said first pressure value;

if said first and second pressure values are valid and these pressure values are consistent, said second pressure value;

if said first pressure value is valid and said second pressure value is not valid, said first pressure value;

if said first pressure value is not valid and said second pressure value is valid, said second pressure value; and if said first and second pressure values are not valid, none of these values.

This selection is based on the fact that:

the first pressure value PBAS1 (calculated using a model starting from the pressure PHPV) is lower than the second pressure value measured by said first sensor alone. In fact, depending on the position of the valve PHPV, the pressure measurement PHVP is generally compared with a pressure measurement of the PS3 type or with an IP model calculated from PS3. PS3 is very precise (discriminating) and very reliable (having redundancy, two sensors) measurement; and the second directly measured pressure value is more precise than said first calculated pressure value.

Moreover and advantageously, in step B/, the air bleed level is calculated in the form of a mass flow WBAS, using the following formula:

$$WBAS^\alpha = ((PBAS + DPBAS/2)TPCE) \cdot (DPBAS/k).$$

in which:

α and k are empirically determined parameters;

PBAS is the selected pressure value, relative to the pressure at the outlet of the precooler;

DPBAS is the pressure difference across the precooler; and

TPCE is the temperature in the precooler.

The present invention also relates to a device for determining an air bleed on a turbojet engine of an aircraft, of a transport aircraft in particular.

According to the invention, said device for determining an air bleed on an aircraft turbojet engine, carried out by an air bleed system comprising, in the direction of the air bleed:

at least a first valve for the air bleed port on the high pressure compressor of the turbojet engine, with which is associated a first pressure sensor;

a saturation valve arranged at the inlet of a precooler;

said precooler; and a second pressure sensor, arranged at the outlet of the precooler, said second sensor measuring the pressure at the outlet of the precooler and intended for monitoring the operation of the saturation valve, said device comprising:

first means configured for determining a pressure value relative to the pressure at the outlet of the precooler; and second means configured for calculating the air bleed level using this pressure value, is noteworthy in that said first means comprise:

means configured for calculating a first pressure value at the outlet of the precooler, using the pressure measured by said first sensor;

means configured for receiving a pressure measured by said second sensor, which represents a second pressure value at the outlet of the precooler; and means configured for selecting one of said first and second pressure values, which is transmitted to said second means for calculating said air bleed level.

The present invention furthermore relates to:

an air bleed system of an aircraft; and/or an aircraft, in particular a transport airplane, which comprise a device such as the one mentioned above.

BRIEF DESCRIPTION OF THE SEVERAL VIEWS OF THE DRAWINGS

The figures of the appended drawing will give a good understanding of how the invention may be embodied. In these figures, identical references denote similar elements.

DETAILED DESCRIPTION OF THE INVENTION

Figure 1:
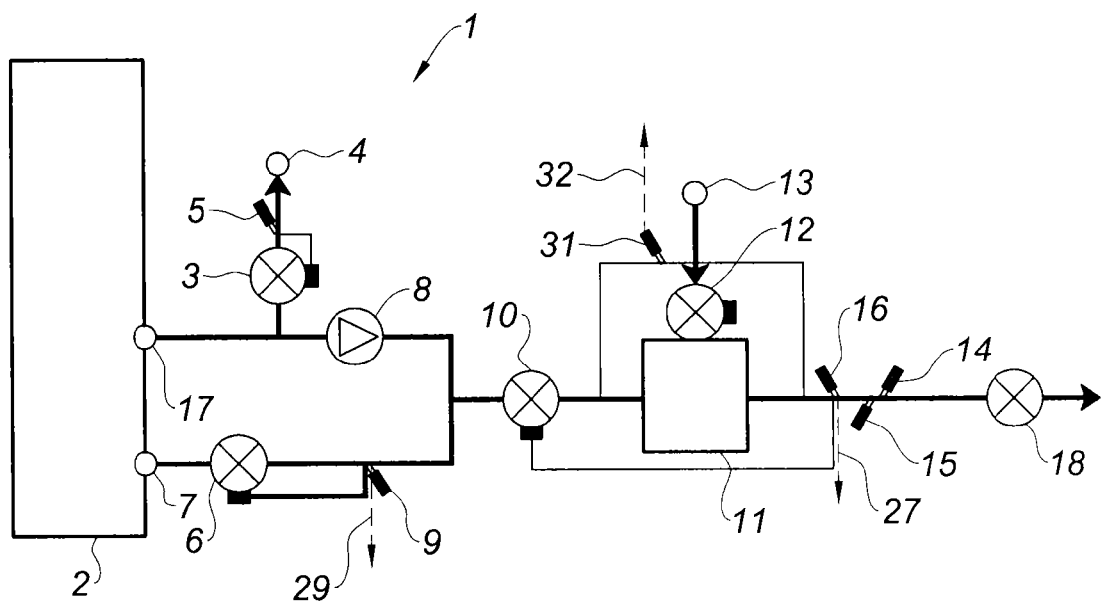
FIG. 1 is the block diagram of an air bleed system, to which the present invention is applied.

The system 1 according to the invention and shown diagrammatically in FIG. 1 is an air bleed system on a turbojet engine of an aircraft (not shown), on a transport airplane in particular.

In a usual manner, said system 1 comprises, associated with the turbojet engine 2:

a valve 3 of the NAIV (Nacelle Anti Ice Valve) type, which does or does not activate the deicing of the air intake of the engine (port 4). A pressure sensor 5 monitors this NAIV valve 3;

a valve 6 of the HPV (High Pressure Valve) type, which makes it possible to define the air bleed port. When it is open, air is bled on port 7 (High Pressure HP) of the HP compressor of the engine 2 (at the level of the last stages of the compressor) and a passive valve 8 of the IPCV (Intermediate Port Check Valve) type is closed by the pressure. When the valve 6 is closed, air is bled at the level of the first stage of the compressor (port 17) via the valve 8 which is open. A pressure sensor 9 of the PHPV type makes it possible to monitor the HPV valve 6;

a saturation valve 10 of the PRSOV type, which is arranged at the inlet of a precooler 11, which saturates, in the usual way, the pressure level at the interface of the aircraft and which can be commanded to close in order to cut off the air bleeds of the aircraft. This PRSOV saturation valve 10 is used to ensure that the pressure at the pylon remains below a threshold value, preferably at 3.8 barg+/−300 mbar, by clipping if necessary;

said precooler 11 which is a radiator, air/air exchanger, and which makes it possible to regulate the temperature of the air at the interface of the aircraft;

a valve 12 of the FAV (Fan Air Valve) type, which makes it possible to vary the air flow making it possible to cool the air from the engine (via a port 13) by the intermediary of the precooler 11;

temperature sensors 14 and 15 which make it possible to regulate and monitor the temperature of the air bleeds of the aircraft;

a pressure sensor 16 PBAS of the simplex type, which makes it possible to monitor the correct operation of the PRSOV saturation valve 10 at the aircraft interface. In the usual manner, the measurement of the pressure at the outlet of the precooler 11 using the pressure sensor 16 is justified by the need to detect failures of said saturation valve 10; and a valve 18 of the BASOV (Bleed Air Shut Off Valve) type, making it possible to shut off the bleeding of air by the aircraft systems.

In a usual way, the air is therefore bled from various air flows flowing in or around the turbojet engine, namely a high pressure air flow, at high temperature, bled at the level of the engine 2 (port 7) and an intermediate pressure air flow, at lower temperature, also bled at the level of the engine 2 (port 17). The high pressure air flow or the intermediate pressure air flow is supplied to the precooler 11. The precooler 11 allows a heat exchange between the flow thus bled at the level of the engine 2 and a cold fan air flow, bled at the level of the fan (port 13), making it possible to lower the temperature of said flow (bled at the level of the engine 2) at the outlet of the precooler 11 in order to supply a flow at a regulated temperature, for example intended for the cockpit or for the passenger cabin of the aircraft. Such regulation is obtained by controlling the opening of one or more of the air flow bleed valves, and notably of the valve 6.

Figure 2:
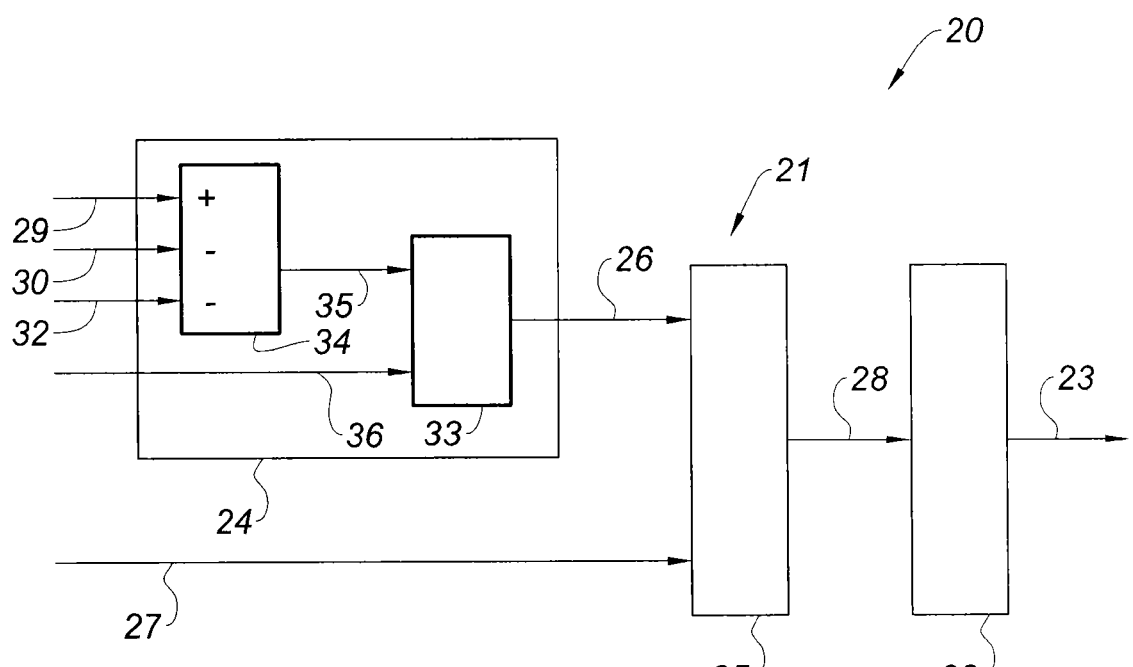
FIG. 2 is the block diagram of a device according to the invention for determining an air bleed on an aircraft turbojet engine.

In a usual way, a device 20 for determining an air bleed on an aircraft turbojet engine comprises, as shown in FIG. 2:

means 21 for determining a pressure value relative to the pressure at the outlet of the precooler 11; and means 22 for calculating the air bleed level using this pressure value, which they can transmit by the intermediary of a link 23 to user systems (not shown).

More precisely, said means 22:

recalculate the pressure and the temperature of the air in the precooler 11; and calculate the mass flow WBAS, from these parameters, in the way described below.

According to the invention, said means 21 comprise:

means 24 for calculating a first pressure value PBAS1 at the outlet of the precooler 11, using the pressure measured by said pressure sensor 9; and means of selection 25 which receive said first pressure value PBAS1 (calculated by said means 24) by the intermediary of a link 26 and which furthermore receive, by the intermediary of a link 27, a pressure measured by said sensor 16, which represents a second pressure value PBAS2 at the outlet of the precooler 11. Said means of selection 25 select one of said first and second pressure values PBAS1 and PBAS2, which is then transmitted to said means 22 via a link 28 in order to calculate said level of air bleed.

According to the invention, said means 24 comprise a means of calculation 34 which calculates said first pressure value PBAS1 at the outlet of said precooler 11, using the following formula:

$$PBAS1 = PHPV - PRSOV - DPBAS$$

in which:

PHPV is the pressure value measured by the pressure sensor 9 and received by the intermediary of a link 29;

PRSOV represents a predetermined value corresponding to a loss of pressure between said valve 6 and the inlet of the precooler 11, which is entered via a link 30; and DPBAS represents a pressure difference across said precooler 11, measured by at least one sensor 31 and received by the intermediary of a link 32.

Thus, due to the invention, the device 20 has available, in addition to a pressure value PBAS2 measured directly in the usual manner at the outlet of the precooler 11 by said sensor 16, an additional pressure value PBAS1 which is determined analytically by said means 24.

The device 20 according to the invention which thus makes it possible to obtain a redundant value of the pressure PBAS at the outlet of the precooler 11 simply by means of an analytical model, does not necessitate a new sensor or new sensors on the engine for its implementation, which makes it possible to limit the cost and the weight of this solution and avoids making the installation of the engine more complex (where there is little space). The analytical redundancy of said sensor 16 is therefore achieved from said sensor 9, whose measurement is acquired via another channel of the computer.

The redundancy of the flow measurement that can be obtained due to the invention makes it possible to satisfy the error rate in "full-up" (computer fully operational on both channels) or in "single channel dispatch" (a single channel of the computer being active) and allows the takeoff of the aircraft with a single active channel of the engine computer with an operational engine air bleed.

Preferably, said pressure difference DPBAS is determined using measurements made by two separate sensors 31.

Said means 24 furthermore comprise a means 33 which limits the value calculated by the calculation means 34 and received by the intermediary of a link 35 to a maximum pressure value, for example 3.8 barg, received by the intermediary of a link 36. The analytically calculated value is thus saturated at 3.8 barg in order to take account of the regulation carried out by the PRSOV saturation valve 10, which keeps the pressure, at the outlet of the precooler 11, below 3.8 barg.

Moreover, said means 25 carry out the abovementioned selection by selecting:

if said pressure values PBAS1 and PBAS2 are valid (or available) and these pressure values are inconsistent, said pressure value PBAS1. This selection is based on the fact that the pressure value PBAS1 (calculated using a model starting from the pressure PHPV) is lower than the pressure value PBAS2 measured by said sensor 16. In fact, depending on the position of the valve PHPV, the pressure measurement PHVP is generally compared with a pressure measurement of the PS3 type or with an IP model calculated from PS3, and PS3 is a very precise (discriminating) and very reliable (having redundancy, two sensors) measurement;

if said pressure values PBAS1 and PBAS2 are valid and these pressure values are consistent, said pressure value PBAS2. The pressure value PBAS2 measured directly by the pressure sensor 16 is in fact, in principle, more accurate than the calculated pressure value PBAS1; and if said pressure value PBAS1 is valid and said pressure value PBAS1 is not valid, said pressure value PBAS1;

if said pressure value PBAS1 if not valid and said pressure value PBAS2 is valid, said pressure value PBAS2; and if said pressure values PBAS1 and PBAS2 are not valid, none of these pressure values.

In the context of the present invention, the pressure values PBAS1 and PBAS2 are considered:
- as consistent, if their difference is less than or equal to a predetermined threshold value; and
- as inconsistent, if their difference is greater than or equal to this threshold value.

Means, which are not shown, are provided for checking this inconsistency.

Moreover, said means 22 calculate the air bleed level, in the form of a mass flow WBAS, using the following formula:

$$WBAS^{\alpha}=((PBAS+DPBAS/2)/TPCE)\cdot(DPBAS/k)$$

in which:

$\alpha$ and k are parameters determined empirically in a usual way;

PBAS is the pressure value, relative to the pressure at the outlet of the precooler 11, as selected by the means 25 between PBAS1 and PBAS2;

DPBAS is the pressure difference (measured par the sensor or sensors 31) across the precooler 11; and TPCE is the temperature in the precooler 11, which is determined in a usual manner.

The present invention thus makes it possible, by using a sensor 9 for monitoring a valve 6 (HPV), which is associated with a functional valve, and another pressure sensor 16, to have a redundant pressure measurement with the same overall accuracy level and the same valid error rate.

The invention claimed is:

1. A method for determining an air bleed on an aircraft turbojet engine, carried out by an air bleed system comprising, in the direction of the air bleed: at least a first valve arranged on an air bleed duct on a high pressure compressor of the turbojet engine, with which a first pressure sensor is associated; a saturation valve arranged at an inlet of a precooler; said precooler; and a second pressure sensor, arranged at an outlet of the precooler, said second pressure sensor measuring a pressure at the outlet of the precooler and monitoring operation of the saturation valve, the method comprising:
   - determining a pressure value relative to the pressure at the outlet of the precooler; and
   - calculating an air bleed level using the determined pressure value,
   - wherein, the determining the pressure value includes:
     - calculating a first pressure value at the outlet of the precooler using the pressure measured by said first pressure sensor;
     - receiving a pressure measured by said second pressure sensor, which represents a second pressure value at the outlet of the precooler; and
     - selecting one of said first and second pressure values at the outlet of the precooler that is used for calculating said air bleed level.

2. The method as claimed in claim 1, wherein the calculating the first pressure value at the outlet of the precooler includes:
   - measuring a pressure PHPV at a level of said first valve using said first pressure sensor;
   - measuring a pressure difference DPBAS across said precooler; and
   - calculating said first pressure value PBAS1 at the outlet of said precooler using the following formula:

$$PBAS1=PHPV-PRSOV-DPBAS$$

in which PRSOV represents a predetermined value, corresponding to a pressure loss between said first valve and the inlet of the precooler.

3. The method as claimed in claim 2, wherein said first pressure value PBAS1 is limited to a predetermined value.

4. The method as claimed in claim 2, wherein said pressure difference DPBAS is determined by measurements made by two separate sensors.

5. The method as claimed in claim 1, wherein:
   - said first pressure value is selected if said first and second pressure values are available and a difference between the first and second pressure values is greater than a predetermined threshold;
   - said second pressure value is selected if said first and second pressure values are available and the difference between the first and second pressure values is less than or equal to the predetermined threshold;
   - said first pressure value is selected if said first pressure value is available and said second pressure value is not available;
   - said second pressure value is selected if said first pressure value is not available and said second pressure value is available; and
   - none of the first and second pressures is selected if said first and second pressure values are not available.

6. The method as claimed in claim 1, wherein the air bleed level is calculated in a form of a mass flow WBAS, using the following formula:

$$WBAS^{\alpha}=((PBAS+DPBAS/2)/TPCE)\cdot(DPBAS/k)$$

in which:

$\alpha$ and k are empirically determined parameters;

PBAS is the selected pressure value, relative to the pressure at the outlet of the precooler;

DPBAS is pressure difference across the precooler; and

TPCE is temperature in the precooler.

7. A device for determining an air bleed on an aircraft turbojet engine, carried out by an air bleed system comprising, in the direction of the air bleed: at least a first valve arranged on an air bleed duct on a high pressure compressor of the turbojet engine, with which a first pressure sensor is associated; saturation valve arranged at an inlet of a precooler; said precooler; and a second pressure sensor, arranged at an outlet of the precooler, said second pressure sensor measuring a pressure at the outlet of the precooler and monitoring the operation of the saturation valve, said device comprising:
   - first means configured for determining a pressure value relative to the pressure at the outlet of the precooler; and
   - second means configured for calculating an air bleed level using the determined pressure value,
   - wherein said first means comprise:
     - means configured for calculating a first pressure value at the outlet of the precooler, using the pressure measured by said first pressure sensor, said first pressure value being limited to a predetermined value;
     - means configured for receiving a pressure measured by said second pressure sensor, which represents a second pressure value at the outlet of the precooler; and
     - means configured for selecting one of said first and second pressure values, which is transmitted to said second means for calculating said air bleed level.

8. An air bleed system for an aircraft, said system comprising a device as claimed in claim 7 for determining an air bleed on a turbojet engine of said aircraft.

9. An aircraft comprising a device as claimed in claim 7 for determining an air bleed on a turbojet engine of said aircraft.

* * * * *